(12) United States Patent
Tresidder et al.

(10) Patent No.: US 9,069,466 B2
(45) Date of Patent: Jun. 30, 2015

(54) METHODS AND APPARATUS FOR SOURCE-SYNCHRONOUS CIRCUITS

(71) Applicant: ADVANCED MICRO DEVICES, INC., Sunnyvale, CA (US)

(72) Inventors: Michael Tresidder, Newmarket (CA); Li Sun, Shanghai (CN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 131 days.

(21) Appl. No.: 13/652,040

(22) Filed: Oct. 15, 2012

(65) Prior Publication Data
US 2014/0103971 A1 Apr. 17, 2014

(51) Int. Cl.
*H04L 7/00* (2006.01)
*H04L 25/00* (2006.01)
*H04L 25/40* (2006.01)
*G06F 5/06* (2006.01)

(52) U.S. Cl.
CPC ........................................ *G06F 5/06* (2013.01)

(58) Field of Classification Search
CPC .................................................. H04L 29/06027
USPC ........................................................... 375/372
See application file for complete search history.

(56) References Cited

U.S. PATENT DOCUMENTS

2013/0002315 A1* 1/2013 Boucard ....................... 327/141

* cited by examiner

*Primary Examiner* — Tanmay Shah
(74) *Attorney, Agent, or Firm* — Park, Vaughan, Fleming & Dowler LLP

(57) ABSTRACT

Source-synchronization between a source module and a responder module generally includes providing, at the source module, an initial determinism reconciliation signal, propagating the initial determinism reconciliation signal from the source module to the responder module and back to the source module to produce a received determinism reconciliation signal, and compensating for an intrinsic delay of the circuit based on the initial determinism reconciliation signal and the received determinism reconciliation signal.

18 Claims, 3 Drawing Sheets

METHODS AND APPARATUS FOR SOURCE-SYNCHRONOUS CIRCUITS

TECHNICAL FIELD

Embodiments of the subject matter described herein relate generally to integrated circuit interconnects. More particularly, embodiments of the subject matter relate to source-synchronous interconnects in ASICs and other integrated circuit devices.

BACKGROUND

As the speed and bandwidth of integrated circuit interconnects have increased in recent years—particularly those interconnects used in conjunction with Application Specific Integrated Circuits (ASICs)—there has been an increased interest in the use of source-synchronous interconnects. In general, a source-synchronous interconnect is one in which data and clock signals are sent from a source to a responder, and the clock signal is then used within the responder interface to latch the accompanying data. Such source-synchronous interconnects are known to exhibit improved tolerance to process-voltage-temperature (PVT) variations.

Conventional source-synchronous interconnects are unsatisfactory in a number of respects, however. For example, many source-synchronous interconnect schemes are susceptible to non-determinism resulting from, among other things, clock insertion differences between the source and the responder. Such non-determinism can complicate system validation processes such as post-silicon debugging and at-speed testing.

Accordingly, there is a need for systems and methods that can eliminate or reduce non-determinism in source-synchronous circuits and interfaces.

BRIEF SUMMARY OF EMBODIMENTS

A method of providing source-synchronization between a source module and a responder module in accordance with one embodiment generally includes providing, at the source module, an initial determinism reconciliation signal, propagating the initial determinism reconciliation signal from the source module to the responder module and back to the source module to produce a received determinism reconciliation signal, and compensating for an intrinsic delay of the circuit based on the initial determinism reconciliation signal and the received determinism reconciliation signal.

A source-synchronization system in accordance with one embodiment comprises a source module comprising an asynchronous FIFO block, and a responder module communicatively coupled to the source module through a plurality of re-timers. The source module is configured to provide an initial determinism reconciliation signal to the responder module, and the responder module is configured to propagate the initial determinism reconciliation and provide it back to the source module to produce a received determinism reconciliation signal that includes an intrinsic delay with respect to the initial determinism reconciliation signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION OF EMBODIMENTS

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, logic elements, look-up tables, or the like, which may carry out a variety of functions under the control of one or more microprocessors or other control devices.

Figure 1:
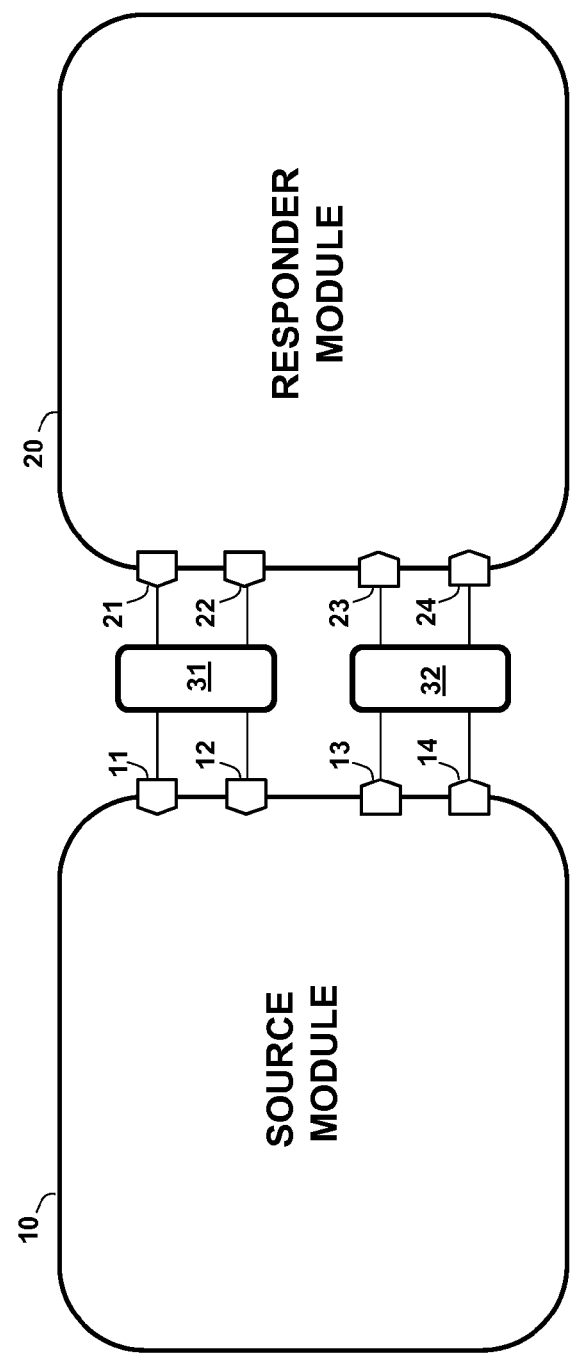
FIG. 1 is a schematic block diagram overview of a typical source-synchronous interface.

Referring now to the drawings, FIG. 1 is a schematic overview of a typical source-synchronous circuit (and interface) useful in describing the embodiments presented herein. In general, a source-synchronous circuit includes a source module 10 configured to communicate with a responder module 20 via re-timers 31 and 32. More particularly, signals from a clock pin 14 and data pin 13 pass through a re-timer block 32 (e.g., a conventional re-timer block known in the art) to a data input pin 23 and a clock input pin 24 on responder module 20. The responder module includes suitable circuitry, such as one or more clock trees, inverters, flip flops (not illustrated) configured to latch the data from pin 23 in accordance with the clock signal on pin 24. In response, responder module processes the data from pin 23 (via responder logic, not illustrated) and passes the result through data pin 21, which itself is latched via a responder clock signal. The respective data and clock signals from pins 21 and 22 pass through another re-timer block 31 and are received by pins 11 and 12. Thus, one source clock (within source module 10) controls the data transmission of the devices, and one return clock controls data reception. The return clock is the clock that is originally sourced from the source module 10, passes through re-timer stages (31 and 32) and responder module 20 post-CTS, then loops back to source module 10.

In accordance with the illustrated source-synchronous circuit, a clock insertion difference exists between source module 10 and responder module 20, and an additional difference exists in the clock signal returned back to source module 10 (via "return clock" pin 12). For this reason, source module 10 will typically also require a first-in, first-out (FIFO) component (not illustrated in FIG. 1) configured to bring the data from pin 11 on return clock pin 12 back into the clock domain of source module 10.

As mentioned previously, the magnitude of the delay between the return clock signal (pin 12) and the source clock signal (pin 14) is non-zero, and is dependent upon, among other things, the circuit's physical implementation. Because the delay is non-zero, it is subject to process/voltage/temperature (PVT) scaling, and can result in an insertion delay difference of more than a full clock cycle—particularly with clocks running at higher frequencies. Such insertion delay differences often result in non-deterministic behavior from chip to chip.

Referring now to the exemplary block diagram illustrated in FIG. 2, systems and methods for eliminating such non-deterministic behavior will now be described.

As shown, the source-synchronous circuit depicted includes a source module 40 coupled to a responder module 60 via two or more (optional) re-timer circuits 80 and 81. That is, signals from source module 40 to responder module 60 pass through re-timer circuit 81, and signals from responder module 60 pass through re-timer circuit 80, analogous to the signal flow depicted in FIG. 1. Re-timer circuits 80 and 81 (which may be included, in some embodiments, to assist in preserving the timing of various signals) are commonly used in such contexts, and need not be discussed in detail herein. It will be appreciated that the design of such re-timer circuits depend, for example, on the distance between circuits 80 and 81 and other physical factors. In some circuits, such re-timer circuits are not required.

Source module 40 includes internal source logic (or "source logic") 50, an asynchronous FIFO block (or simply "FIFO block" 51), a reconciliation synchronizer block 52, a clock tree 57, an inverter 58, flip-flops 53 and 54, inverter 59, and flip-flops 55 and 56. Similarly, responder module 60 includes internal responder logic (or "responder logic") 70, flip flop 71, inverter 72, flip-flops 73 and 74, inverter 77, clock tree 78, and flip-flops 75 and 76. Various pins associated with source module 40 (pins 41-46) are coupled to various pins associated with responder module 60 (pins 61-66) through re-timers 80 and 81, as described in further detail below.

As illustrated, pin 45 corresponds to the clock from source module 40, inverted through inverter 59. Pin 46 corresponds to a source data signal from source logic 50, latched by flip-flop 56 via the non-inverted source clock. Pin 44 corresponds to a determinism (DTM) reconciliation signal 44 latched through flip-flop 55 via the same non-inverted source clock.

The outputs of pins 44, 45, and 46 are coupled, via re-timer 81, to corresponding pins 64, 65, and 66, respectively, of responder module 60. The signal from pin 65 is coupled to internal logic 70 of responder module 60 via an inverter 77 and clock tree 78, consumed by all flip-flops inside module 60. The signal from pin 66 (the data signal from source module 40) is coupled to internal logic 70 of responder module 60 through flip-flops 74 and 76, wherein flip-flop 74 is latched via the clock signal from pin 65, and flip-flop 76 is latched via the clock signal subsequent to inverter 77 and clock tree 78.

Significantly, the signal from pin 64 (the "DTM reconciliation signal") is not coupled to internal logic 70 of responder module 60, but instead propagates through flip-flops 73 and 75 (which are latched via clock signals also used for flip-flops 74 and 76, respectively) and then presented as output at pin 63.

Pin 62 of responder module 60 corresponds to an inverted version of the output clock signal from clock tree 78, and pin 61 corresponds to an output data signal from internal logic 70, latched via the output clock signal from clock tree 78.

The outputs of pins 61, 62, and 63 are coupled, via re-timer 80, to corresponding pins 41, 42, and 43, respectively, of source module 40. The data signal from pin 41 is latched via flip-flop 53 and the clock signal from pin 42, while the DTM reconciliation signal from pin 43 is latched via flip-flop 54 and the same clock signal. The output of flip-flop 53 is provided to FIFO block 51, while the output of flip-flop 54 is provided to both FIFO block 51 and synchronizer 52. FIFO block 51 is also coupled to the clock signal provided by internal logic 50 (i.e., an uninverted version of the output of pin 45). The clock signal from pin 42 is coupled, via inverter 58 and clock tree 57, to FIFO block 51—the outputs of which enter the internal logic 50 of source module 40. Synchronizer 52 uses the same clock that is driving flip-flops 55 and 56, and the read side of FIFO 51, to synchronize output of flip-flop 54 to the clock domain of source module 40. The output of synchronizer 52 enters the internal logic 50 of source module 40.

Figure 2:
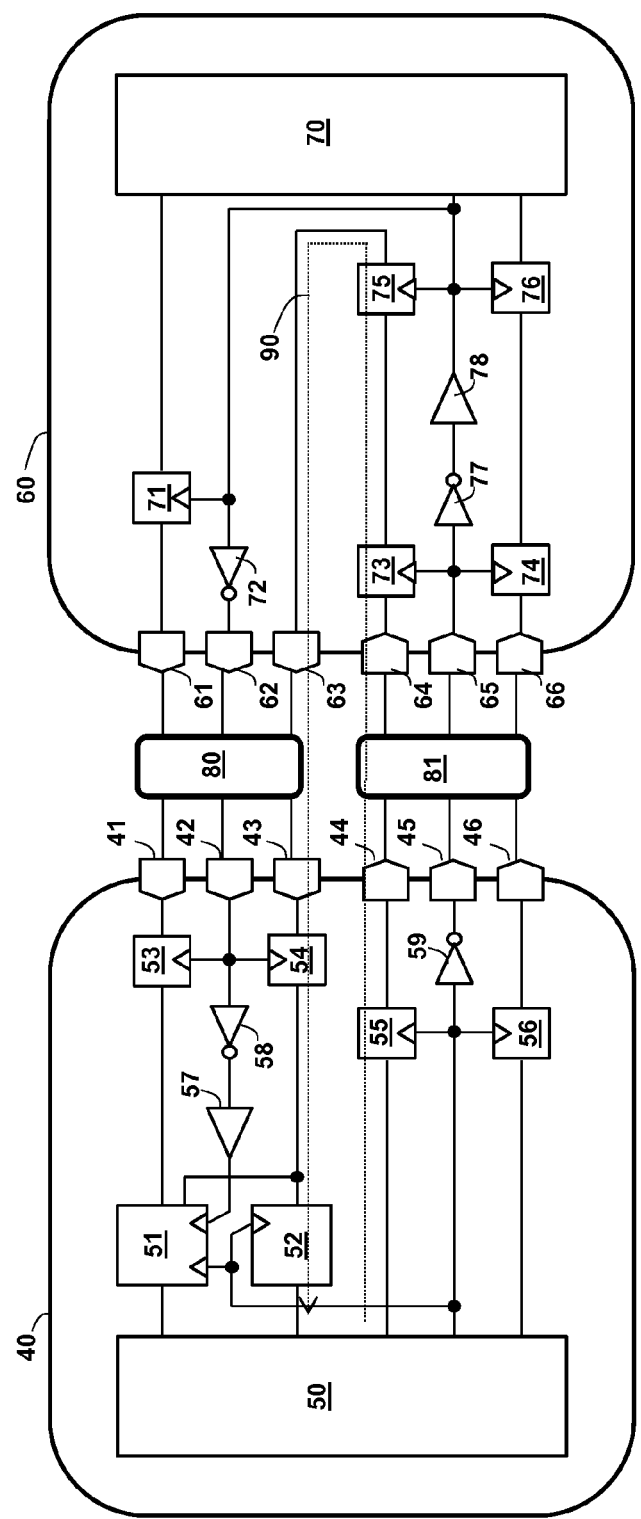
FIG. 2 is a schematic block diagram representation of an exemplary source-synchronous interface in accordance with an exemplary embodiment.
Figure 3:
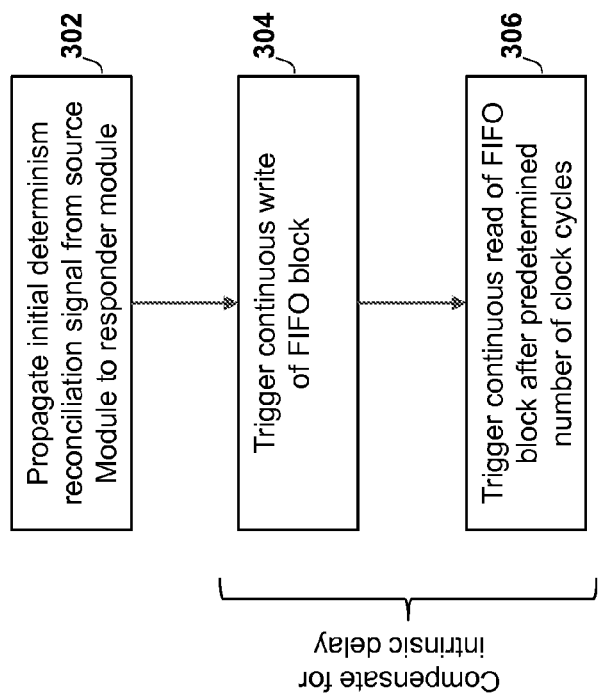
FIG. 3 is a flowchart depicting a method in accordance with an exemplary embodiment.

Referring now to the exemplary method illustrated in FIG. 3 in conjunction with the system diagram of FIG. 2, when in "determinism" (DTM) mode, a signal (e.g., a 0-1 transition, pulse, or the like) is transmitted over (or propagates through) what may be termed a "source-sync" loop (indicated by dotted line 90), which corresponds to the loop through flip-flop 55, re-timer 81, flip-flops 73 and 75 of responder module 60, and flip-flop 54 (traversing pins 44, 64, 63, and 43) (step 302). It will be appreciated that this signal travels through the source-sync loop without any additional delays (i.e., other than those delays presented by the enumerated components). The leading edge of this signal is captured at source module 40 along with the source-sync data (pin 41), and both are moved into the source module's time domain. What the DTM reconciliation signal then includes is a measure of the intrinsic delay through the source-sync loop, for which the system can compensate. In this regard, the DTM reconciliation signal as produced by source module 40 may be referred to as the initial DTM reconciliation signal, and the signal ultimately received back by source module 40 (after propagating through responder module 60) may be referred to as the received DTM reconciliation signal. The difference between these two signals is therefore the intrinsic delay of the source-sync loop. Note that the general phrase "DTM reconciliation signal" may be used herein to refer to the state of this signal at any particular point in its path.

When the DTM reconciliation signal from pin 43 arrives back at source module 40, it preferably immediately starts up the write side of FIFO block 51, and thereafter runs continuously (step 304). That is, the returned DTM reconciliation signal performs as the "write enable" to the FIFO block 51. As a result, it is desirable to provide a "valid" bit in FIFO block 51 initially, as well as any data being returned (via pin 41). In this regard, the term "valid bit" is used to distinguish between actual data and filler data, the latter being desirable to ensure that the FIFO block 51 remains running in continuous mode. It is also desirable to re-synchronize the DTM reconciliation signal back through block 52 into the clock domain of source block 40 for error detection purposes.

The read side of FIFO block 51 starts up, or read-enabled, 'N' clock cycles after the internal logic 50 of source module 40 originally provided the DTM reconciliation signal into the loop (step 306). This 'N' clock delay preferably has a value larger than the intrinsic delay of the source-sync loop to ensure that the DTM reconciliation wave-front arrives prior to the read-side start up, and the size of FIFO block 51 should be large enough to buffer the difference between 'N' and the minimum possible latency of the DTM reconciliation wave front while the write side runs continuously. Furthermore, when the read-pointer to FIFO block 51 starts up, it is desirable to run a hardware assertion to check that the re-synced DTM reconciliation signal, the output from block 52, has been received, thereby assuring source module 40 that it is receiving the correct data. Also note that it is not necessary to actually determine or "measure" the intrinsic delay. It is sufficient to know that the cycles exceeds the maximum intrinsic delay, and that the FIFO size is sufficiently large, as detailed above. In this way, the system effectively compensates for the intrinsic delay.

In summary, what is provided is a source synchronous interface in which a "DTM reconciliation" signal is provided that travels from source module 40 to responder module 60 and back to source module 40 in such a way that it includes an intrinsic delay through the source-sync loop, for which the system can compensate. The DTM reconciliation signal also triggers the continuous write of FIFO block 51, while the predetermined "N" clock cycles in the clock domain of source module 40 triggers the continuous read of FIFO block 51. In this way, non-deterministic behavior can be effectively eliminated in the response path of the source synchronous circuit.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of providing source-synchronization between a source module and a responder module, the method comprising:
propagating an initial determinism reconciliation signal from the source module to the responder module and back to the source module to produce a received determinism reconciliation signal, the propagating comprising sending the initial determinism reconciliation signal from the source module to the responder module and receiving the received determinism reconciliation signal from the responder module at the source module; and
compensating for an intrinsic delay based on the initial determinism reconciliation signal and the received determinism reconciliation signal, the compensating comprising triggering one or more operations in the source module a period of time after sending the initial determinism reconciliation signal, the period of time being set to a value that is greater than the intrinsic delay.

2. The method of claim 1, further including providing, at the source module, the initial determinism reconciliation signal.

3. The method of claim 1, further including triggering continuous write of a FIFO block within the source module based on the receiving of the received determinism reconciliation signal.

4. The method of claim 3, wherein triggering one or more operations in the source module a period of time after sending the initial determinism reconciliation signal comprises triggering a continuous read of the FIFO block.

5. The method of claim 4, further including providing a valid bit within the FIFO block along with receiving data from the responder module.

6. The method of claim 4, further including running a hardware assertion to check that the received determinism reconciliation signal has been received at the source module from the responder module before triggering the continuous read of the FIFO block.

7. The method of claim 1, wherein the received determination reconciliation signal propagates through a source-sync loop associated with the source module and the responder module.

8. A source-synchronization system comprising:
a source module comprising an asynchronous FIFO block;
a responder module communicatively coupled to the source module;
wherein the source module:
propagates an initial determinism reconciliation signal from the source module to the responder module and back to the source module to produce a received determinism reconciliation signal, the propagating comprising sending the initial determinism reconciliation signal from the source module to the responder module and receiving the received determinism reconciliation signal from the responder module at the source module; and
compensates for an intrinsic delay based on the initial determinism reconciliation signal and the received determinism reconciliation signal, the compensating comprising triggering one or more operations in the source module a period of time after sending the initial determinism reconciliation signal, the period of time being set to a value that is greater than the intrinsic delay.

9. The source-synchronization system of claim 8, wherein the determinism reconciliation signal propagates through a source-sync loop associated with the source module and the responder module.

10. The source-synchronization system of claim 8, wherein the source module is further configured to trigger continuous write of the asynchronous FIFO block based on the receiving of the received determinism reconciliation signal.

11. The source-synchronization system of claim 10, wherein triggering one or more operations in the source module a period of time after sending the initial determinism reconciliation signal comprises triggering a continuous read of the FIFO block.

12. The source-synchronization system of claim 11, wherein the source module is further configured to provide a valid bit within the FIFO block along with receiving data from the responder module.

13. The source-synchronization system of claim 11, wherein the source module is further configured to run a hardware assertion to check that the received determinism reconciliation signal has been received at the source module from the responder module before triggering the continuous read of the FIFO block.

14. The source-synchronization system of claim 8, wherein the initial determinism reconciliation signal propagates through a first flip-flop within the source module, a second flip-flop within the responder module, a third flip-flop within the source module, and a fourth flip-flop within the source module to result in the received determinism reconciliation signal.

15. The source-synchronization system of claim 14, wherein:
- a data signal from the source module propagates through a fifth flip-flop within the source module, a sixth flip-flop within the responder module, and a seventh flip-flop within the responder module;
- wherein the first flip-flop, the second flip-flop, and the third flip-flop are respectively latched by first, second, and third clock signals; and
- wherein the fifth flip-flop, the sixth flip-flop, and the seventh flip-flop are respectively latched by the first, second, and third clock signals.

16. A method of providing source-synchronization between a source module and a responder module communicatively coupled thereto, the method comprising:
- sending an initial determinism reconciliation signal from the source module to the responder module;
- propagating the initial determinism reconciliation signal through the responder module;
- sending the propagated determinism reconciliation signal from the responder module to the source module; and
- compensating for an intrinsic delay with respect to the initial determinism reconciliation signal based on the propagated determinism reconciliation signal, the compensating comprising triggering one or more operations at a time that is set based on a measure of intrinsic delay that is based on the propagated determinism reconciliation signal.

17. The method of claim 16, further including triggering continuous write of a FIFO block within the source module based on receiving the propagated determinism reconciliation signal in the source module.

18. The method of claim 17, wherein triggering one or more operations at a time that is set based on the intrinsic delay comprises triggering a continuous read of the FIFO block.

* * * * *